United States Patent
Kang et al.

(10) Patent No.: US 10,047,179 B2
(45) Date of Patent: Aug. 14, 2018

(54) HEAT-RESISTANT STYRENE COPOLYMER AND STYRENE RESIN COMPOSITION COMPRISING THE SAME

(71) Applicant: LG CHEM, LTD., Seoul (KR)

(72) Inventors: Byoung Il Kang, Daejeon (KR); Chang Hun Han, Daejeon (KR); Jae Bum Seo, Daejeon (KR); Eun Jung Choi, Daejeon (KR); Da Eun Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 14 days.

(21) Appl. No.: 14/909,924

(22) PCT Filed: Apr. 8, 2015

(86) PCT No.: PCT/KR2015/003541
§ 371 (c)(1),
(2) Date: Feb. 3, 2016

(87) PCT Pub. No.: WO2015/163608
PCT Pub. Date: Oct. 29, 2015

(65) Prior Publication Data
US 2017/0247486 A1 Aug. 31, 2017

(30) Foreign Application Priority Data

Apr. 25, 2014 (KR) .................. 10-2014-0050047
Apr. 8, 2015 (KR) .................. 10-2015-0049695

(51) Int. Cl.
| | | |
|---|---|---|
| *C08F 212/10* | (2006.01) | |
| *C08L 25/14* | (2006.01) | |
| *C08F 212/12* | (2006.01) | |
| *C08L 25/16* | (2006.01) | |
| *C08L 51/04* | (2006.01) | |
| *C08L 55/02* | (2006.01) | |

(52) U.S. Cl.
CPC .......... *C08F 212/10* (2013.01); *C08F 212/12* (2013.01); *C08L 25/14* (2013.01); *C08L 25/16* (2013.01); *C08L 51/04* (2013.01); *C08L 55/02* (2013.01); *C08L 2201/08* (2013.01)

(58) Field of Classification Search
CPC ........ C08F 212/10; C08L 25/14; C08L 51/06; C08L 55/02
See application file for complete search history.

(56) References Cited

U.S. PATENT DOCUMENTS

| | | | |
|---|---|---|---|
| 5,010,138 A | 4/1991 | Westeppe et al. | |
| 5,639,826 A | 6/1997 | Niessner | |
| 2008/0039584 A1* | 2/2008 | Bening | C08F 297/04 525/88 |
| 2011/0020575 A1 | 1/2011 | Knoll et al. | |
| 2014/0235749 A1 | 8/2014 | Kim et al. | |

FOREIGN PATENT DOCUMENTS

| | | |
|---|---|---|
| CN | 101864040 A | 10/2010 |
| JP | S57-55945 A | 4/1982 |
| JP | S57-55946 A | 4/1982 |
| JP | S60-203612 A | 10/1985 |
| JP | S61-155439 A | 7/1986 |
| JP | H02-103262 A | 4/1990 |
| JP | 2011-513544 A | 4/2011 |
| KR | 10-0173878 B1 | 4/1999 |
| KR | 10-2004-0110322 A | 12/2004 |
| KR | 10-2005-0020200 A | 3/2005 |
| KR | 10-2014-0027872 A | 3/2014 |
| KR | 10-2014-0082119 A | 7/2014 |
| TW | 548308 B | 8/2003 |

OTHER PUBLICATIONS

International Search Report for International Patent Application No. PCT/KR2015/003541 filed Apr. 8, 2015.

* cited by examiner

*Primary Examiner* — Jeffrey C Mullis

(57) ABSTRACT

Provided is a styrene resin composition including α-methyl styrene, acrylonitrile and t-butyl methacrylate, and having an improved conversion rate while maintaining excellent mechanical and chemical properties, a styrene resin composition including the same, and a styrene resin molded product manufactured therefrom. Accordingly, the heat-resistant styrene copolymer is effective in improving a conversion rate without deformation and mechanical and chemical property decline of the material itself, and as a result, commercialization may be readily accomplished due to enhanced productivity. In addition, the styrene resin molded product manufactured from the styrene resin composition according to the present invention includes the heat-resistant styrene copolymer as a matrix copolymer, and therefore, has excellent impact strength, tensile strength, tensile elongation and flowability while having high heat resistance.

19 Claims, No Drawings

HEAT-RESISTANT STYRENE COPOLYMER AND STYRENE RESIN COMPOSITION COMPRISING THE SAME

CROSS-REFERENCE TO RELATED APPLICATIONS

This application is a U.S. National Stage of International Patent Application No. PCT/KR2015/003541 filed Apr. 8, 2015, which claims the priority of Korean Patent Application No. 10-2014-0050047 filed on Apr. 25, 2014, and No. 10-2015-0049695 filed on Apr. 8, 2015, in the Korean Intellectual Property Office, the disclosures of which are incorporated herein by reference.

TECHNICAL FIELD

The present invention relates to a heat-resistant styrene copolymer including $\alpha$-methyl styrene, acrylonitrile and t-butyl methacrylate having an improved conversion rate while maintaining excellent mechanical and chemical properties, a styrene resin composition including the same, and a styrene resin molded product manufactured therefrom.

BACKGROUND ART

In general, styrene copolymers have excellent moldability, rigidity and electrical properties, and have been widely used in various industrial fields including OA equipment such as computers, printers and copy machines, home appliances such as televisions and audios, electrical and electronic components, automobile components, miscellaneous goods and the like. Particularly, heat-resistant styrene copolymers having favorable resistance at high outside temperatures by enhancing heat resistance have been used for particular applications such as housing for home appliances and automobile interior materials.

$\alpha$-Methyl styrene (AMS) is commonly used in order to obtain a styrene copolymer having high heat resistance. $\alpha$-Methyl styrene is relatively inexpensive and has excellent heat resistance, but is polymerized at a temperature lower than polymerization temperatures of existing styrene copolymers due to a low ceiling temperature (Tc), and accordingly, has a problem in that conversion rate significantly decreases. A low conversion rate is directly related to a productivity decrease, and as a result, is a great obstacle in industrial applications.

Accordingly, in order to readily apply a heat-resistant styrene copolymer to industry, a technology that does not decline mechanical and chemical properties originally possessed by a heat-resistant styrene copolymer while increasing productivity by complementing a disadvantage of a low ceiling temperature of $\alpha$-methyl styrene and enhancing a conversion rate of the heat-resistant styrene copolymer, that is, a technology enhancing a conversion rate and not causing deformation to an original heat-resistant styrene copolymer has been required.

In view of the above, the inventors of the present invention have studied on methods not affecting mechanical and chemical properties possessed by the heat-resistant styrene copolymer while increasing productivity by enhancing a conversion rate of the copolymer, and have identified that, after a heat-resistant styrene copolymer is prepared through mass-polymerization by adding a small amount of t-butyl methacrylate to $\alpha$-methyl styrene and acrylonitrile, which compose common existing heat-resistant styrene copolymers, and is analyzed, a conversion rate of the heat-resistant styrene copolymer is enhanced without causing physical property changes, and have completed the present invention.

PRIOR ART DOCUMENT

Patent Documents (Patent Document 1) KR2014-0082119 A

DISCLOSURE

Technical Problem

An aspect of the present invention is directed to providing a heat-resistant styrene copolymer including $\alpha$-methyl styrene, acrylonitrile and t-butyl methacrylate having an improved conversion rate while maintaining excellent mechanical and chemical properties.

Another aspect of the present invention is directed to providing a styrene resin composition including the heat-resistant styrene copolymer and a rubber copolymer.

Still another aspect of the present invention is directed to providing a styrene resin molded product manufactured from the styrene resin composition.

Technical Solution

According to an embodiment of the present invention, there is provided a heat-resistant styrene copolymer including A) $\alpha$-methyl styrene in 60 wt % to 78 wt %; B) acrylonitrile in 20 wt % to 38 wt %; and C) t-butyl methacrylate in 0.5 wt % to 7 wt %.

According to another embodiment of the present invention, there is provided a styrene resin composition including the a) heat-resistant styrene copolymer in 60 wt % to 80 wt %; and a b) rubber copolymer in 20 wt % to 40 wt %.

According to still another embodiment of the present invention, there is provided a styrene resin molded product manufactured from the styrene resin composition.

Advantage Effects

The heat-resistant styrene copolymer according to the present invention includes $\alpha$-methyl styrene, acrylonitrile and t-butyl methacrylate in a specific ratio, for example, in a weight ratio of 70:25:5, and therefore, is effective in improving a conversion rate without deformation and mechanical and chemical property decline of the heat-resistant styrene copolymer, and as a result, commercialization can be readily accomplished due to enhanced productivity.

In addition, the styrene resin molded product manufactured from the styrene resin composition according to the present invention includes the heat-resistant styrene copolymer as a matrix copolymer, and therefore, has excellent impact strength, tensile strength, tensile elongation and flowability while having high heat resistance.

Accordingly, the heat-resistant styrene copolymer and the styrene resin composition including the same can be widely used in various industrial fields required.

BEST MODE

Hereinafter the present invention will be explained in more detail to assist the understanding thereof.

In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a heat-resistant styrene copolymer including α-methyl styrene, acrylonitrile and t-butyl methacrylate having an increased conversion rate while maintaining excellent mechanical and chemical properties.

Heat-resistant styrene copolymers are widely used for special applications such as automobile interior materials and home appliance housings. α-Methyl styrene (AMS) is commonly used in order to obtain such a styrene copolymer having high heat resistance, however, α-methyl styrene is polymerized at a temperature significantly lower than polymerization temperatures of existing styrene copolymers due to a low ceiling temperature (Tc), which leads to a problem of a significant conversion rate decrease. A low conversion rate is directly related to a productivity decrease, and as a result, is a great obstacle in industrial applications.

Accordingly, in order to readily apply a heat-resistant styrene copolymer in industries, a technology that does not decline mechanical and chemical properties originally possessed by a heat-resistant styrene copolymer while increasing productivity by enhancing a conversion rate of α-methyl styrene is required.

In view of the above, the present invention provides a heat-resistant styrene copolymer adding t-butyl methacrylate to α-methyl styrene and acrylonitrile, and copolymerizing the result and having an improved conversion rate without declining mechanical and chemical properties of an original α-methyl styrene-acrylonitrile copolymer (AMS-AN).

The heat-resistant styrene copolymer according to one embodiment of the present invention includes A) α-methyl styrene in 60 wt % to 78 wt %; B) acrylonitrile in 20 wt % to 38 wt %; and C) t-butyl methacrylate in 0.5 wt % to 7 wt %.

The heat-resistant styrene copolymer is a graft copolymer of α-methyl styrene, acrylonitrile and t-butyl methacrylate, and may be an α-methyl styrene-acrylonitrile-t-butyl methacrylate copolymer (AMS-AN-TBMA) including α-methyl styrene in 60 wt % to 78 wt %, acrylonitrile in 20 wt % to 38 wt % and t-butyl methacrylate in 0.5 wt % to 7 wt % as described above.

The A) alpha (α)-methyl styrene (AMS) according to the present invention is an alkylated styrene compound represented by the following Chemical Formula 1, and has excellent heat resistance and impact strength, therefore, is used as a chemical intermediate or raw material for providing heat resistance and impact strength in resin and polymer preparation.

[Chemical Formula 1]

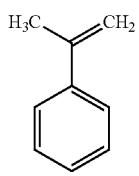

The α-methyl styrene in the present invention has excellent heat resistance and impact strength as described above, thereby is capable of performing a role of enhancing impact strength while providing excellent heat resistance to the heat-resistant styrene copolymer, a matrix copolymer. However, the α-methyl styrene has a very low ceiling temperature (Tc, 66° C.), and when polymerized alone, polymerization needs to be carried out for a long period of time at a low temperature, and the polymerized polymer is unstable and also has a low conversion rate, which leads to a productivity decrease problem. Accordingly, the present invention adds acrylonitrile and t-butyl methacrylate to be described later to the α-methyl styrene, and copolymerizes the result to more readily carry out polymerization by raising a ceiling temperature while providing additional mechanical and chemical property enhancement.

Herein, the ceiling temperature (Tc) means an upper limit of a temperature range enabling an exothermic reaction progressing thermodynamically in a reversible reaction, and when a certain material is at a ceiling temperature, a polymerization rate and a depolymerization rate are the same, and when a temperature is higher than a ceiling temperature, polymerization is suppressed since a depolymerization rate is higher than a polymerization rate, which may cause a problem in that polymerization to a target polymer does not readily occur.

The heat-resistant styrene copolymer, a matrix copolymer, may include the α-methyl styrene in 60 wt % to 78 wt %, and specifically, may include in 68 wt % to 73 wt %. When the α-methyl styrene is included in less than 60 wt %, an effect of heat resistance enhancement may be insignificant, and when the α-methyl styrene is included in greater than 78 wt %, the content of acrylonitrile and t-butyl methacrylate to be described later relatively decreases, and an effect of conversion rate enhancement may be insignificant, and as a result, a molecular weight and the purity of the copolymer may decrease due to the generation of quantities of residual monomers caused by a low conversion rate. In addition, low molecular materials and quantities of residual monomers function as impurities in the copolymer, and generates volatile substances in quantities when processed thereby keeps the process from being readily progressed, and may cause a heat deformation temperature decrease although capable of enhancing a glass transition temperature (Tg).

The B) acrylonitrile (AN) according to the present invention is a type of an unsaturated nitrile-based compound, and is widely used as a raw material of synthetic rubber and synthetic resins due to high reactivity and polymerizability.

The B) acrylonitrile in the present invention may perform a role of not only complementing a low ceiling temperature of the A) α-methyl styrene to readily carry out polymerization, but also providing enhancement of mechanical and chemical properties such as impact strength and chemical resistance of the finally produced copolymer by increasing the molecular weight of the heat-resistant styrene copolymer including the acrylonitrile.

The heat-resistant styrene copolymer, a matrix copolymer, may include the acrylonitrile in 20 wt % to 38 wt %, and specifically in 25 wt % to 32 wt %. When the heat-resistant styrene copolymer includes the acrylonitrile in less than 20 wt %, polymerization is incomplete causing the generation of quantities of unreacted materials and mechanical properties may decline since a sufficiently high molecular weight is not formed, and including the acrylonitrile in greater than 38 wt % may cause a heat resistance decrease.

The C) tert-butyl methacrylate (TBMA) according to the present invention is a type of alkyl methacrylate, and has very favorable reactivity due to a double bond present in the t-butyl methacrylate, and accordingly, is capable of readily forming a polymer.

The t-butyl methacrylate in the present invention has excellent reactivity and a high ceiling temperature (200° C. or higher), and together with the B) acrylonitrile, may perform a role of readily carrying out polymerization by increasing polymerization reactivity while raising a polymerization temperature by complementing a ceiling temperature of the A) α-methyl styrene. As a result, a conversion rate may be enhanced without lowering heat resistance of the heat-resistant styrene copolymer.

The heat-resistant styrene copolymer, a matrix copolymer, may include the t-butyl methacrylate in 0.5 wt % to 7 wt %, and specifically in 1 wt % to 5 wt %. When the t-butyl methacrylate is included in less than 0.5 wt %, effects of enhancing a ceiling temperature and polymerization reactivity are insignificant, and a conversion rate of the heat-resistant styrene copolymer may not be improved, and when the t-butyl methacrylate is included in greater than 7 wt %, a conversion rate may be more greatly improved due to increased effects of enhancing a ceiling temperature and polymerization reactivity, however, the effect of enhancing a conversion rate is insignificant considering the amount used, and there may be a problem in that economic feasibility is reduced since the t-butyl methacrylate is expensive compared to other monomers used in the polymerization. Moreover, when the t-butyl methacrylate is excessively included (greater than 7 wt %), a mechanical and chemical property balance of the styrene copolymer is broken (for example, excessive increase in the glass transition temperature), and as a result, when a molded product is manufactured blending the styrene copolymer with a rubber copolymer such as an acrylonitrile-butadiene-styrene copolymer (ABS) resin, a problem of significantly declining mechanical and chemical properties of the molded product may occur.

The heat-resistant styrene copolymer according to one example of the present invention may include A) α-methyl styrene, B) acrylonitrile and C) t-butyl methacrylate to have a weight ratio of 70 to 72:23 to 29.5:0.5 to 7, and specifically, the weight ratio of A) α-methyl styrene to B) acrylonitrile to C) t-butyl methacrylate may be 70:23 to 29.5:0.5 to 5. More specifically, the weight ratio may be 70:25 to 27:3 to 5.

When the heat-resistant styrene copolymer is polymerized at a polymerization temperature of 105° C., a conversion rate may be preferably from 40% to 60%, a glass transition temperature (Tg) may be preferably in a range of 123° C. to 128° C., and a weight average molecular weight (Mw) may be preferably from 87,000 to 91,000.

Meanwhile, the heat-resistant styrene copolymer, a matrix copolymer, is not particularly limited, and may be prepared through mass-polymerization commonly known in the art.

The mass-polymerization may be carried out by, while not being limited thereto, for example, mixing α-methyl styrene, acrylonitrile, t-butyl methacrylate and a reaction medium, reacting the result while heating at a temperature of 80° C. to 130° C. to prepare a polymerized compound, and removing unreacted materials and the reaction medium.

As the reaction medium, common organic solvents may be used, and examples thereof may include an aromatic compound such as ethyl benzene, benzene, toluene and xylene, and methyl ethyl ketone, acetone, n-hexane, chloroform, cyclohexane and the like, but are not limited thereto.

The mass-polymerization may further include additives such as a polymerization initiator and a molecular weight controlling agent in addition to the materials described above.

The polymerization initiator is not particularly limited, however, as examples thereof, an aqueous persulfate-based polymerization initiator such as potassium persulfate, sodium persulfate or ammonium persulfate, and a redox-based polymerization initiator having a peroxide such as hydrogen peroxide, cumene hydroperoxide, diisopropylbenzene hydroperoxide, tertiary butyl hydroperoxide or paramenthane hydroperoxide as one component may be added either alone or as a mixture.

As the molecular weight controlling agent, common materials such as mercaptans may be used, however, examples thereof may include n-butyl mercaptan, n-octyl mercaptan, n-dodecyl mercaptan, t-dodecyl mercaptan and the like, and specifically, may be t-dodecyl mercaptan.

In addition, the present invention provides a styrene resin composition including the heat-resistant styrene copolymer and a rubber copolymer.

The styrene resin composition according to one embodiment of the present invention includes the a) heat-resistant styrene copolymer in 60 wt % to 80 wt %; and a b) rubber copolymer in 20 wt % to 40 wt %.

The a) heat-resistant styrene copolymer is an α-methyl styrene-acrylonitrile-t-butyl methacrylate copolymer (AMS-AN-TBMA) including A) α-methyl styrene, B) acrylonitrile and C) t-butyl methacrylate as described above, and may function as a matrix copolymer (continuous phase) in the styrene resin composition.

The styrene resin composition of the present invention may include the heat-resistant styrene copolymer in 60 wt % to 80 wt % as described above, and specifically in 70 wt % to 80 wt %. When the heat-resistant styrene copolymer is included outside the range described above, there may be a problem in that flowability of the styrene resin composition decreases causing reduction in moldability when a molded product is manufactured using the composition, or reduction in tensile strength, heat resistance, and impact resistance of a molded product manufactured from the composition.

The b) rubber copolymer according to the present invention is added as a kind of a filler, and may be present in a dispersed phase in the styrene resin composition, and the rubber copolymer preferably has an average diameter of 250 nm to 500 nm.

The b) rubber copolymer may be at least one selected from the group consisting of b-1) an acrylonitrile-butadiene-styrene graft copolymer (ABS) having a core-shell structure, and b-2) an acrylate-styrene-acrylonitrile graft copolymer (ASA) having a core-shell structure.

Hereinafter, the b) rubber copolymer will be described in more detail.

b-1) Acrylonitrile-Butadiene-Styrene Graft Copolymer (ABS) Having Core-Shell Structure The acrylonitrile-butadiene-styrene graft copolymer (ABS) having a core-shell structure may have a diene copolymer core and a shell including a styrene monomer and an acrylonitrile monomer grafted on the core.

Specifically, the acrylonitrile-butadiene-styrene graft copolymer (ABS) having a core-shell structure may have a diene copolymer core in 50 wt % to 80 wt %; and a shell including a styrene monomer and an acrylonitrile monomer grafted on the core in 20 wt % to 50 wt %. Herein, the thickness ratio of the core to the shell may be from 4:6 to 8:2, and specifically from 5:5 to 7:3.

In addition, the shell may include the styrene monomer and the acrylonitrile monomer in a weight ratio of 7:3 to 8:2.

An average diameter of the acrylonitrile-butadiene-styrene graft copolymer having a core-shell structure is not particularly limited as long as it is within an average diameter range of the rubber copolymer, but may specifically have an average diameter of 250 nm to 400 nm.

Meanwhile, the acrylonitrile-butadiene-styrene graft copolymer having a core-shell structure is not particularly limited, and may be used by preparation using methods commonly known in the art, or commercially available materials may be purchased and used.

For example, when the acrylonitrile-butadiene-styrene graft copolymer having a core-shell structure is used by preparation, the acrylonitrile-butadiene-styrene graft copolymer having a core-shell structure may be prepared by preparing a diene copolymer core, and graft copolymerizing a shell including a styrene monomer and an acrylonitrile monomer on the prepared diene copolymer core.

The diene copolymer core is not particularly limited and may be prepared using methods commonly known in the art, but may be prepared by, for example, introducing additives such as ion exchanged water, an emulsifying agent, a polymerization initiator, an electrolyte and a molecular weight controlling agent to a conjugated diene monomer, and emulsion polymerizing the result.

The emulsion polymerization is not particularly limited and may be carried out using common methods known in the art, but, for example, may be carried out by introducing additives such as ion exchanged water, an emulsifying agent and a polymerization initiator all together to a conjugated diene monomer, and reacting the result, or may be carried out by a reaction while continuously introducing additives divided according to a polymerization conversion rate time.

Specifically, the emulsion polymerization may be carried out using a method including introducing a conjugated diene monomer, and with respect to 100 parts by weight of the conjugated diene monomer, ion exchanged water in 70 to 120 parts by weight, an emulsifying agent in 0.2 parts by weight to 2.5 parts by weight, a polymerization initiator in 0.1 to 1.5 parts by weight, an electrolyte in 0.5 to 2 parts by weight, and a molecular weight controlling agent in 0.1 to 1 parts by weight in a polymerization reactor all together, and reacting the result at a temperature range of 50° C. to 90° C. Herein, the conjugated diene monomer may be added together with other constituents or additives and then reacted, or may be introduced in installments of several times or continuously introduced during the polymerization reaction.

The conjugated diene monomer may be at least one selected from the group consisting of 1,3-butadiene, isoprene, chloroprene and piperylene, and specifically, may be 1,3-butadiene.

The polymerization initiator and the molecular weight controlling agent may be the same as or include the materials described above.

The emulsifying agent is not particularly limited, but may be one type, or a combination of two or more types selected from the group consisting of alkyl aryl sulfonate, alkali methyl alkyl sulfate, sulfonated alkyl ester, fatty acid soap and an alkali salt of rosin acid.

The electrolyte is not particularly limited, however, examples thereof may include at least one selected from the group consisting of potassium chloride, sodium chloride, potassium bicarbonate, sodium carbonate, potassium carbonate, potassium hydrogen sulfate, sodium hydrogen sulfate, tetrapotassium pyrophosphate, tetrasodium pyrophosphate, tripotassium phosphate, trisodium phosphate, dipotassium hydrogen phosphate and disodium hydrogen phosphate.

The shell including a styrene monomer and an acrylonitrile monomer may be formed on the diene copolymer core by introducing a styrene monomer and an acrylonitrile monomer, additives such as an emulsifying agent, a polymerization initiator and a molecular weight controlling agent to the prepared diene copolymer core, and graft copolymerizing the result.

The styrene monomer may be at least one selected from the group consisting of styrene, α-methyl styrene, α-ethyl styrene, p-ethyl styrene, vinyl toluene and a derivative thereof, and specifically, may be styrene.

The acrylonitrile monomer may be at least one selected from the group consisting of acrylonitrile, methacrylonitrile, ethacrylonitrile and a derivative thereof, and specifically, may be acrylonitrile.

The additives such as an emulsifying agent, a polymerization initiator and a molecular weight controlling agent may be the same as or include the materials described above.

b-2) Acrylate-Styrene-Acrylonitrile Graft Copolymer (ASA) Having Core-Shell Structure The acrylate-styrene-acrylonitrile graft copolymer having a core-shell structure may have an acrylate polymer core and a shell including a styrene monomer and an acrylonitrile monomer being grafted on the core.

Specifically, the acrylate-styrene-acrylonitrile graft copolymer having a core-shell structure may have an acrylate polymer core in 40 wt % to 60 wt %; and a shell including a styrene monomer and an acrylonitrile monomer grafted on the core in 40 wt % to 60 wt %. Herein, the thickness ratio of the core to the shell may be from 4:6 to 8:2, and specifically from 5:5 to 7:3.

In addition, the shell may include the styrene monomer and the acrylonitrile monomer in a weight ratio of 7:3 to 8:2.

An average diameter of the acrylate-styrene-acrylonitrile graft copolymer having a core-shell structure is not particularly limited as long as it is within an average diameter range of the rubber copolymer, but may specifically have an average diameter of 250 nm to 400 nm.

Meanwhile, the acrylate-styrene-acrylonitrile graft copolymer having a core-shell structure is not particularly limited, and may be used by preparation using methods commonly known in the art, or commercially available materials may be purchased and used.

For example, when the acrylate-styrene-acrylonitrile graft copolymer having a core-shell structure is used by preparation, the acrylate-styrene-acrylonitrile graft copolymer having a core-shell structure may be prepared by preparing an acrylate polymer core, and graft copolymerizing a shell including a styrene monomer and an acrylonitrile monomer on the prepared acrylate polymer core.

The acrylate polymer core is not particularly limited and may be prepared using methods commonly known in the art, but may be prepared by, for example, introducing additives such as ion exchanged water, an emulsifying agent, a polymerization initiator, a grafting agent, a crosslinking agent, an electrolyte and a molecular weight controlling agent to an alkyl acrylate monomer, and emulsion polymerizing the result.

Specifically, the emulsion polymerization may be carried out using a method including introducing an alkyl acrylate monomer, and with respect to 100 parts by weight of the alkyl acrylate monomer, ion exchanged water in 70 to 120 parts by weight, an emulsifying agent in 0.1 to 3 parts by weight, a polymerization initiator in 0.05 to 0.3 parts by weight, a grafting agent in 0.01 to 0.07 parts by weight, a crosslinking agent in 0.02 to 0.3 parts by weight, an electrolyte in 0.05 to 0.4 parts by weight, and a molecular weight controlling agent in 0.02 to 0.2 parts by weight in a polymerization reactor all together, and reacting the result at a temperature range of 50° C. to 90° C. Herein, the alkyl acrylate monomer may be added together with other constituents or additives and then reacted, or may be introduced in installments of several times or continuously introduced during the polymerization reaction.

The alkyl acrylate monomer may be butyl acrylate, ethylhexyl acrylate or a mixture thereof, and specifically, may be butyl acrylate.

The emulsifying agent, the polymerization initiator, the electrolyte and the molecular weight controlling agent may be the same as or include the materials described above.

The grafting agent may be at least one selected from the group consisting of aryl methacrylate (AMA), triaryl isocyanurate (TRIC), triarylamine (TAA) and diarylamine (DAA).

The crosslinking agent may be at least one selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate and trimethylol triacrylate.

The shell including a styrene monomer and an acrylonitrile monomer may be formed on the acrylate polymer core by introducing a styrene monomer and an acrylonitrile monomer, additives such as an emulsifying agent, a polymerization initiator and a molecular weight controlling agent to the prepared acrylate polymer core, and graft copolymerizing the result. Herein, in the graft copolymerization, the styrene monomer, the acrylonitrile monomer and the additives including an emulsifying agent may be introduced all together and then reacted, however, progressing a reaction by introducing the materials in installments or introducing the materials continuously is preferable in order to uniformly graft the materials on the acrylate polymer core.

The styrene monomer and the acrylonitrile monomer may be the same as or include the materials described above.

The styrene resin composition according to one embodiment of the present invention may further include one or more additives selected from the group consisting of a thermal stabilizer, a lubricant, an antioxidant, a photostabilizer, a flame retardant, an antistatic agent, a coloring agent, a filler and a UV stabilizer as necessary in addition to the active components described above.

Moreover, the present invention provides a styrene resin molded product manufactured from the styrene resin composition.

The styrene resin molded product according to one embodiment of the present invention has impact strength of 20 J/m to 25 J/m measured in accordance with ASTM D256 when having a thickness of ¼", and has tensile elongation of 28% to 40% measured in accordance with ASTM D638 under a rate condition of 5 cm/min.

Herein, the ASTM (American Society for Testing and Materials) represents one standard test method and specification testing plastic performances, and ASTM D256 means an Izod impact resistance test, and ASTM D638 means a tension test.

Hereinafter, the present invention will be described in more detail with reference to the following examples and test examples. However, the following examples and the test examples are for illustrative purposes only, and the scope of the present invention is not limited thereto.

PREPARATION EXAMPLE 1

A monomer mixture including 70 wt % of α-methyl styrene, 29.5 wt % of acrylonitrile and 0.5 wt % of t-butyl methacrylate, and 5 parts by weight of ethyl benzene and 0.1 parts by weight of a polymerization initiator (Perhexa C, NOF) with respect to 100 parts by weight of the monomer mixture were introduced to a 1 L batch reactor and then mixed, and the result was mass-polymerized for 6 hours while being rotated at 200 rpm at a polymerization temperature of 104° C. After the polymerization was complete, the result was precipitated using methanol, dried for 2 hours in a vacuum oven at 220° C. to prepare a heat-resistant styrene copolymer.

PREPARATION EXAMPLE 2

A heat-resistant styrene copolymer was prepared in the same manner as in Preparation Example 1 except that the acrylonitrile was used in 29 wt %, and the t-butyl methacrylate was used in 1 wt %.

PREPARATION EXAMPLE 3

A heat-resistant styrene copolymer was prepared in the same manner as in Preparation Example 1 except that the acrylonitrile was used in 27 wt %, and the t-butyl methacrylate was used in 3 wt %.

PREPARATION EXAMPLE 4

A heat-resistant styrene copolymer was prepared in the same manner as in Preparation Example 1 except that the acrylonitrile was used in 25 wt %, and the t-butyl methacrylate was used in 5 wt %.

PREPARATION EXAMPLE 5

A heat-resistant styrene copolymer was prepared in the same manner as in Preparation Example 1 except that the α-methyl styrene was used in 72 wt %, the acrylonitrile was used in 27 wt %, and the t-butyl methacrylate was used in 1 wt %.

PREPARATION EXAMPLE 6

A heat-resistant styrene copolymer was prepared in the same manner as in Preparation Example 1 except that the α-methyl styrene was used in 72 wt %, the acrylonitrile was used in 25 wt %, and the t-butyl methacrylate was used in 3 wt %.

PREPARATION EXAMPLE 7

A heat-resistant styrene copolymer was prepared in the same manner as in Preparation Example 1 except that the polymerization temperature was adjusted to 106° C.

PREPARATION EXAMPLE 8

A heat-resistant styrene copolymer was prepared in the same manner as in Preparation Example 2 except that the polymerization temperature was adjusted to 106° C.

PREPARATION EXAMPLE 9

A heat-resistant styrene copolymer was prepared in the same manner as in Preparation Example 3 except that the polymerization temperature was adjusted to 106° C.

PREPARATION EXAMPLE 10

A heat-resistant styrene copolymer was prepared in the same manner as in Preparation Example 4 except that the polymerization temperature was adjusted to 106° C.

PREPARATION EXAMPLE 11

A heat-resistant styrene copolymer was prepared in the same manner as in Preparation Example 5 except that the polymerization temperature was adjusted to 106° C.

PREPARATION EXAMPLE 12

A heat-resistant styrene copolymer was prepared in the same manner as in Preparation Example 6 except that the polymerization temperature was adjusted to 106° C.

COMPARATIVE PREPARATION EXAMPLE 1

A heat-resistant styrene copolymer was prepared in the same manner as in Preparation Example 1 except that the α-methyl styrene was used in 72 wt %, the acrylonitrile was used in 20 wt %, and the t-butyl methacrylate was used in 8 wt %.

COMPARATIVE PREPARATION EXAMPLE 2

A heat-resistant styrene copolymer was prepared in the same manner as in Preparation Example 1 except that the α-methyl styrene was used in 72 wt %, the acrylonitrile was used in 28 wt %, and the t-butyl methacrylate was not used.

COMPARATIVE PREPARATION EXAMPLE 3

A heat-resistant styrene copolymer was prepared in the same manner as in Preparation Example 1 except that the α-methyl styrene was used in 70 wt %, the acrylonitrile was used in 29.7 wt %, and the t-butyl methacrylate was used in 0.3 wt %.

COMPARATIVE PREPARATION EXAMPLE 4

A heat-resistant styrene copolymer was prepared in the same manner as in Preparation Example 1 except that the α-methyl styrene was used in 70 wt %, the acrylonitrile was used in 30 wt %, and the t-butyl methacrylate was not used.

COMPARATIVE PREPARATION EXAMPLE 5

A heat-resistant styrene copolymer was prepared in the same manner as in Comparative Preparation Example 1 except that the polymerization temperature was adjusted to 106° C.

COMPARATIVE PREPARATION EXAMPLE 6

A heat-resistant styrene copolymer was prepared in the same manner as in Comparative Preparation Example 2 except that the polymerization temperature was adjusted to 106° C.

COMPARATIVE PREPARATION EXAMPLE 7

A heat-resistant styrene copolymer was prepared in the same manner as in Comparative Preparation Example 3 except that the polymerization temperature was adjusted to 106° C.

COMPARATIVE PREPARATION EXAMPLE 8

A heat-resistant styrene copolymer was prepared in the same manner as in Comparative Preparation Example 4 except that the polymerization temperature was adjusted to 106° C.

TEST EXAMPLE 1

For each heat-resistant styrene copolymer prepared in Preparation Example 1 to Preparation Example 12 and Comparative Preparation Example 1 to Comparative Preparation Example 8, a glass transition temperature (Tg), a conversion rate (%) and a weight average molecular weight (Mw) were measured, and the measured values are shown in the following Table 1.

1) Glass Transition Temperature (Tg, ° C.)

After each heat-resistant styrene copolymer was heated to 150° C., melted and then rapidly cooled, the glass transition temperature was measured with a heating rate of 10° C./min using a DSC method.

2) Conversion Rate (%)

The initial weight of each reactant prior to polymerization of each heat-resistant styrene copolymer was measured, the monomer-based weight subtracting the content of the solvent was recorded, and the weight of the each heat-resistant styrene copolymer produced after the polymerization reaction was measured. The conversion rate was measured as a ratio of the monomer weight prior to the polymerization and the weight of the heat-resistant styrene copolymer after the polymerization.

3) Weight Average Molecular Weight (Mw, g/mol)

The weight average molecular weight was measured using Gel Permeation Chromatography (GPC, Waters 2410 RI Detector, 515 HPLC pump. 717 Auto Sampler). 20 ml of tetrahydrofuran (THF) was introduced to 0.02 g of each heat-resistant styrene copolymer to dissolve the copolymer, the result was filtered using a 0.45 μm filter and placed in a GPC vial (4 ml) to prepare each sample. From an hour prior to the measurement, a solvent (THF) was injected at a rate of 1.0 ml/min, and the weight average molecular weight was measured with a measuring time of 25 minutes, an injection volume of 150 μl, a flow rate of 1.0 ml/min, an isocratic pump mode, and an RI detector under a condition of 40° C. Herein, calibration was carried out using a PS standard.

TABLE 1

| Category (Polymerization Temperature: 104° C.) | Preparation Example 1 | Preparation Example 2 | Preparation Example 3 | Preparation Example 4 | Preparation Example 5 | Preparation Example 6 | Comparative Preparation Example 1 | Comparative Preparation Example 2 | Comparative Preparation Example 3 | Comparative Preparation Example 4 |
|---|---|---|---|---|---|---|---|---|---|---|
| Added TBMA Amount (wt %) | 0.5 | 1 | 3 | 5 | 1 | 3 | 8 | 0 | 0.3 | 0 |
| Tg (° C.) | 125 | 125 | 126 | 128 | 127 | 127 | 130 | 126 | 126 | 125 |
| Conversion Rate (%) | 47 | 49 | 53 | 55 | 47 | 50 | 52 | 44 | 44 | 46 |
| Mw (g/mol) | 90,000 | 88,500 | 89,000 | 91,000 | 87,000 | 88,000 | 92,000 | 87,000 | 87,000 | 91,000 |

| Category (Polymerization Temperature: 106° C.) | Preparation Example 7 | Preparation Example 8 | Preparation Example 9 | Preparation Example 10 | Preparation Example 11 | Preparation Example 12 | Comparative Preparation Example 5 | Comparative Preparation Example 6 | Comparative Preparation Example 7 | Comparative Preparation Example 8 |
|---|---|---|---|---|---|---|---|---|---|---|
| Added TBMA Amount (wt %) | 0.5 | 1 | 3 | 5 | 1 | 3 | 8 | 0 | 0.3 | 0 |
| Tg (° C.) | 123 | 123 | 124 | 126 | 124 | 126 | 128 | 124 | 124 | 123 |
| Conversion Rate (%) | 43 | 45 | 49 | 52 | 43 | 45 | 49 | 40 | 40 | 42 |
| Mw (g/mol) | 89,000 | 88,500 | 89,000 | 91,000 | 87,000 | 88,000 | 91,000 | 85,000 | 85,000 | 86,000 |

As shown in Table 1, it was identified that the heat-resistant styrene copolymer prepared in Preparation Example 1 to Preparation Example 12 according to the present invention including t-butyl methacrylate exhibited excellent glass transition temperature and weight average molecular weight values as the conversion rate was improved.

Specifically, when comparing each heat-resistant styrene copolymer prepared in Preparation Example 1 to Preparation Example 6, and Comparative Preparation Example 1 to Comparative Preparation Example 4, which carried out a polymerization reaction at a polymerization temperature of 104° C., the heat-resistant styrene copolymer of Preparation Example 1 to Preparation Example 6 according to the present invention had an improved conversion rate (enhanced by minimum 1% to maximum 11%) while maintaining similar glass transition temperature and weight average molecular weight values, compared to the heat-resistant styrene copolymer of Comparative Preparation Example 2 and Comparative Preparation Example 4 not including t-butyl methacrylate.

In addition, when comparing each heat-resistant styrene copolymer prepared in Preparation Example 7 to Preparation Example 12, and Comparative Preparation Example 5 to Comparative Preparation Example 8, which carried out a polymerization reaction at a polymerization temperature of 106° C., the heat-resistant styrene copolymer of Preparation Example 7 to Preparation Example 12 according to the present invention had an improved conversion rate (enhanced by minimum 1% to maximum 12%) while maintaining similar glass transition temperature and weight average molecular weight values, compared to the heat-resistant styrene copolymer of Comparative Preparation Example 6 and Comparative Preparation Example 8 not including t-butyl methacrylate.

Meanwhile, in Comparative Preparation Example 3 (polymerization temperature 104° C.) and Comparative Preparation Example 7 (polymerization temperature 106° C.) including t-butyl methacrylate but in less than the content range according to the present invention, conversion rates equal to those of Comparative Preparation Example 2 and Comparative Preparation Example 6, which did not include t-butyl methacrylate, were obtained. This is a result indicating that using t-butyl methacrylate in less than a specific amount does not help enhancing the conversion rate of the heat-resistant styrene copolymer. In addition, in Comparative Preparation Example 1 (polymerization temperature 104° C.) and Comparative Preparation Example 5 (polymerization temperature 106° C.) including t-butyl methacrylate but in greater than the content range according to the present invention, conversion rates increased to a similar level with Preparation Example 1 to Preparation Example 6, and Preparation Example 7 to Preparation Example 12 prepared under the same condition, respectively, however, glass transition temperatures also showed a tendency to greatly increase. This shows that, when quantities of t-butyl methacrylate is added in the polymerization, deformation may occur or physical properties may be changed in the prepared heat-resistant styrene copolymer, and furthermore, when the heat-resistant styrene copolymer is used as a matrix copolymer and blended with a filler (dispersed phase) such as other rubber copolymers, the balance is broken causing a problem of significantly declining physical properties of a finally produced molded resin product.

In other words, improving only a conversion rate without deformation and physical property changes in the heat-resistant styrene copolymer is important, and it was primarily identified through the results described above that each heat-resistant styrene copolymer prepared in Preparation Example 1 to Preparation Example 12 according to the present invention improved the conversion rate and did not cause deformation or physical property changes in the copolymer.

In order for comparative analysis on the properties of each heat-resistant styrene copolymer prepared in Preparation Example 1 to Preparation Example 12, and Comparative Preparation Example 1 to Comparative Preparation Example 8, and particularly, for secondary identification on deformation and physical property changes in the heat-resistant styrene copolymer, each styrene resin molded product (pellet) was prepared according to the following Example 1 to Example 12 and Comparative Example 1 to Comparative Example 8, and comparatively analyzed.

EXAMPLE 1

A styrene resin composition was prepared by mixing the heat-resistant styrene copolymer prepared in Preparation Example 1 in 75 wt % and an acrylonitrile-butadiene-styrene graft copolymer having a core-shell structure (LG Chem., Ltd.) 25 wt %, and the composition was manufactured into pellets using a twin-screw extruder at 240° C.

EXAMPLE 2

Pellets were manufactured in the same manner as in Example 1 except that the heat-resistant styrene copolymer prepared in Preparation Example 2 was used instead of the heat-resistant styrene copolymer prepared in Preparation Example 1.

EXAMPLE 3

Pellets were manufactured in the same manner as in Example 1 except that the heat-resistant styrene copolymer prepared in Preparation Example 3 was used instead of the heat-resistant styrene copolymer prepared in Preparation Example 1.

EXAMPLE 4

Pellets were manufactured in the same manner as in Example 1 except that the heat-resistant styrene copolymer prepared in Preparation Example 4 was used instead of the heat-resistant styrene copolymer prepared in Preparation Example 1.

EXAMPLE 5

Pellets were manufactured in the same manner as in Example 1 except that the heat-resistant styrene copolymer prepared in Preparation Example 5 was used instead of the heat-resistant styrene copolymer prepared in Preparation Example 1.

EXAMPLE 6

Pellets were manufactured in the same manner as in Example 1 except that the heat-resistant styrene copolymer prepared in Preparation Example 6 was used instead of the heat-resistant styrene copolymer prepared in Preparation Example 1.

EXAMPLE 7

Pellets were manufactured in the same manner as in Example 1 except that the heat-resistant styrene copolymer prepared in Preparation Example 7 was used instead of the heat-resistant styrene copolymer prepared in Preparation Example 1.

EXAMPLE 8

Pellets were manufactured in the same manner as in Example 1 except that the heat-resistant styrene copolymer prepared in Preparation Example 8 was used instead of the heat-resistant styrene copolymer prepared in Preparation Example 1.

EXAMPLE 9

Pellets were manufactured in the same manner as in Example 1 except that the heat-resistant styrene copolymer prepared in Preparation Example 9 was used instead of the heat-resistant styrene copolymer prepared in Preparation Example 1.

EXAMPLE 10

Pellets were manufactured in the same manner as in Example 1 except that the heat-resistant styrene copolymer prepared in Preparation Example 10 was used instead of the heat-resistant styrene copolymer prepared in Preparation Example 1.

EXAMPLE 11

Pellets were manufactured in the same manner as in Example 1 except that the heat-resistant styrene copolymer prepared in Preparation Example 11 was used instead of the heat-resistant styrene copolymer prepared in Preparation Example 1.

EXAMPLE 12

Pellets were manufactured in the same manner as in Example 12 except that the heat-resistant styrene copolymer prepared in Preparation Example 12 was used instead of the heat-resistant styrene copolymer prepared in Preparation Example 1.

COMPARATIVE EXAMPLE 1

Pellets were manufactured in the same manner as in Example 1 except that the heat-resistant styrene copolymer prepared in Comparative Preparation Example 1 was used instead of the heat-resistant styrene copolymer prepared in Preparation Example 1.

COMPARATIVE EXAMPLE 2

Pellets were manufactured in the same manner as in Example 1 except that the heat-resistant styrene copolymer prepared in Comparative Preparation Example 2 was used instead of the heat-resistant styrene copolymer prepared in Preparation Example 1.

COMPARATIVE EXAMPLE 3

Pellets were manufactured in the same manner as in Example 1 except that the heat-resistant styrene copolymer prepared in Comparative Preparation Example 3 was used instead of the heat-resistant styrene copolymer prepared in Preparation Example 1.

COMPARATIVE EXAMPLE 4

Pellets were manufactured in the same manner as in Example 1 except that the heat-resistant styrene copolymer prepared in Comparative Preparation Example 4 was used instead of the heat-resistant styrene copolymer prepared in Preparation Example 1.

COMPARATIVE EXAMPLE 5

Pellets were manufactured in the same manner as in Example 1 except that the heat-resistant styrene copolymer prepared in Comparative Preparation Example 5 was used instead of the heat-resistant styrene copolymer prepared in Preparation Example 1.

COMPARATIVE EXAMPLE 6

Pellets were manufactured in the same manner as in Example 1 except that the heat-resistant styrene copolymer prepared in Comparative Preparation Example 6 was used instead of the heat-resistant styrene copolymer prepared in Preparation Example 1.

COMPARATIVE EXAMPLE 7

Pellets were manufactured in the same manner as in Example 1 except that the heat-resistant styrene copolymer prepared in Comparative Preparation Example 7 was used instead of the heat-resistant styrene copolymer prepared in Preparation Example 1.

COMPARATIVE EXAMPLE 8

Pellets were manufactured in the same manner as in Example 1 except that the heat-resistant styrene copolymer prepared in Comparative Preparation Example 8 was used instead of the heat-resistant styrene copolymer prepared in Preparation Example 1.

TEST EXAMPLE 2

In order to comparatively analyze mechanical and chemical properties of each pellet, a molded product manufactured from the styrene resin composition prepared in Examples 1 to 12 and Comparative Examples 1 to 8, tensile strength (TS), tensile elongation (TE), impact strength, flowability and heat resistance (HDT) were analyzed for each pellet, and the results are shown in the following Table 2.

1) Tensile Strength (TS) and Tensile Elongation (TE) Analysis

The tensile strength and the tensile elongation were analyzed in accordance with ASTM D638. Each pellet of Examples 1 to 12 and Comparative Examples 1 to 8 was injection molded at 300° C. to prepare each specimen having a thickness of ⅛", both ends of the specimen were clamped on the clamps of a tension tester, and then the clamp on one side was fixed, and the clamp on the other side was pulled at 5 cm/min to obtain a load value when being cut, and tensile strength (MPa) and tensile elongation (%) were obtained through the following Mathematical Equation 1 and Mathematical Equation 2.

$$\text{Tensile strength(MPa)} = \frac{\text{load when being cut(cm)}}{\text{thickness of specimen(cm)} \times \text{width of specimen(cm)}} \times 10.197162 (\text{kgf/cm}^2) \quad \text{[Mathematical Equation 1]}$$

$$\text{Tensile elongation(\%)} = \frac{\text{specimen stretching(cm)}}{\text{distance between surfaces(cm)}} \times 100 \quad \text{[Mathematical Equation 2]}$$

2) Impact Strength (Impact Resistance, J/m)

The impact strength was analyzed in accordance with ASTM D256. Each pellet of Examples 1 to 12 and Comparative Examples 1 to 8 was molded to a thickness of ¼" to prepare a specimen, the specimen was supported on an Izod impact tester, and hit with a hammer, and the impact strength value was obtained through Mathematical Equation 3 after measuring the used energy and the cut width of the specimen. The hitting rate of the hammer was approximately 240 cm/sec.

$$\text{Impact strength(J/m)} = \frac{E}{Nw} \quad \text{[Mathematical Equation 3]}$$

In the equation, Nw represents a width (m) of the cut portion of the specimen, and E represents energy (J) used for the fracture of the specimen.

3) Flowability (Melting Index, g/10 min)

The flowability was analyzed in accordance with ASTM D1238. Each pellet manufactured in Examples 1 to 12 and Comparative Examples 1 to 8 was injection molded at 300° C. to prepare each specimen having a thickness of ¼", and the each specimen was heated to a temperature of 220° C., and placed in a cylinder. 10 kg of a load was applied thereto using a piston, and the weight (g) of the resin come out melted for 10 minutes was measured.

4) Heat Resistance (HDT, ° C.)

The heat resistance was analyzed in accordance with ASTM D648. Each pellet manufactured in Examples 1 to 12 and Comparative Examples 1 to 8 was injection molded at 300° C. to prepare each specimen having a thickness of ¼", and the each specimen was placed on a support each separated by 4 inches. The surrounding temperature was raised at a rate of 2±0.2° C. per minute while applying a load of 66 psi to the center, and a temperature at which the specimen was deformed by 0.010 inch was measured.

TABLE 2

| Category | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| TS (MPa) | 578 | 580 | 563 | 570 | 559 | 562 | 579 | 590 | 582 | 552 |
| TE (%) | 34 | 35 | 30 | 29 | 37 | 33 | 15 | 32 | 30 | 36 |
| Impact Strength (J/m) | 21 | 22 | 20 | 20 | 25 | 23 | 16 | 24 | 24 | 25 |
| Flowability (g/10 min) | 8 | 9 | 8 | 7 | 9 | 8 | 4 | 9 | 9 | 10 |
| Heat Resistance (° C.) | 98 | 99 | 100 | 100 | 98 | 99 | 101 | 98 | 98 | 97 |

TABLE 2-continued

| Category | Example 7 | Example 8 | Example 9 | Example 10 | Example 11 | Example 12 | Comparative Example 5 | Comparative Example 6 | Comparative Example 7 | Comparative Example 8 |
|---|---|---|---|---|---|---|---|---|---|---|
| TS (MPa) | 565 | 582 | 575 | 575 | 559 | 564 | 573 | 590 | 591 | 552 |
| TE (%) | 31 | 32 | 30 | 28 | 37 | 33 | 15 | 32 | 30 | 36 |
| Impact Strength (J/m) | 23 | 22 | 21 | 22 | 25 | 24 | 14 | 24 | 24 | 25 |
| Flowability (g/10 min) | 8 | 9 | 8 | 7 | 9 | 8 | 4 | 9 | 9 | 10 |
| Heat Resistance (° C.) | 96 | 97 | 97 | 99 | 97 | 98 | 100 | 96 | 96 | 96 |

As shown in Table 2, it was identified that each styrene resin molded product manufactured in Example 1 to Example 12 according to the present invention exhibited similar or more excellent mechanical and chemical properties compared to each styrene resin molded product manufactured in Comparative Example 1 to Comparative Example 8.

Specifically, when compared with the styrene resin molded product of Comparative Example 2, Comparative Example 4, Comparative Example 6 and Comparative Example 8 including the heat-resistant styrene copolymer of Comparative Preparation Example 2, Comparative Preparation Example 4, Comparative Preparation Example 6 and Comparative Preparation Example 8 not including t-butyl methacrylate as a matrix copolymer, the styrene resin molded product of Example 1 to Example 12 including the heat-resistant styrene copolymer of Preparation Example 1 to Preparation Example 12 including t-butyl methacrylate in a proper ratio as a matrix copolymer exhibited similar or more or less excellent tensile strength, tensile elongation, impact strength, flowability and heat resistance. This means that, by the heat-resistant styrene copolymer prepared in Preparation Example 1 to Preparation Example 12 according to the present invention including t-butyl methacrylate in a proper ratio, the conversion rate was improved, and deformation or physical property changes did not occur in the copolymer.

Meanwhile, the styrene resin molded product of Comparative Example 1 and Comparative Example 5, which included the heat-resistant styrene copolymer prepared in Comparative Preparation Example 1 and Comparative Preparation Example 5 including t-butyl methacrylate excessively outside the content according to the present invention as a matrix copolymer, had very reduced tensile elongation, impact strength and flowability compared to the styrene resin molded product of Example 1 to Example 12 according to the present invention and the styrene resin molded product of other Comparative Examples. This is a result indicating that, by including excess t-butyl methacrylate, t-butyl methacrylate was gelated and present as impurities in the heat-resistant styrene copolymer, which causes physical property decline.

The invention claimed is:

1. A heat-resistant styrene copolymer comprising:
    A) α-methyl styrene in an amount of 60 wt % to 78 wt %;
    B) acrylonitrile in an amount of 20 wt % to 38 wt %; and
    C) t-butyl methacrylate in an amount of 0.5 wt % to 7 wt %,
    wherein the heat-resistant styrene copolymer has a glass transition temperature (Tg) in a range of 123° C. to 128° C. and a weight average molecular weight (Mw) of 87,000 to 91,000.

2. The heat-resistant styrene copolymer of claim 1, wherein the C) t-butyl methacrylate is included in an amount of 1 wt % to 5 wt %.

3. The heat-resistant styrene copolymer of claim 1, wherein the styrene copolymer has, when polymerized at a polymerization temperature of 105° C., a conversion rate of 40% to 60%.

4. A styrene resin composition comprising:
    the a) heat-resistant styrene copolymer of claim 1 in 60 wt % to 80 wt %; and
    a b) rubber copolymer in an amount of 20 wt % to 40 wt %.

5. The styrene resin composition of claim 4, wherein the b) rubber copolymer is at least one selected from the group consisting of an acrylonitrile-butadiene-styrene graft copolymer having a core-shell structure (ABS) and an acrylate-styrene-acrylonitrile graft copolymer having a core-shell structure (ASA).

6. The styrene resin composition of claim 4, wherein the b) rubber copolymer has an average diameter of 250 nm to 500 nm.

7. The styrene resin composition of claim 5, wherein the acrylonitrile-butadiene-styrene graft copolymer having a core-shell structure (ABS) comprises a diene copolymer core in an amount of 50 wt % to 80 wt %; and a shell including a styrene monomer and an acrylonitrile monomer grafted on the core in an amount of 20 wt % to 50 wt %, wherein a thickness ratio of the core to the shell is from 4:6 to 8:2.

8. The styrene resin composition of claim 7, wherein the shell comprises the styrene monomer and the acrylonitrile monomer in a weight ratio of 7:3 to 8:2.

9. The styrene resin composition of claim 7, wherein the diene copolymer is derived from one or more of conjugated diene monomers selected from the group consisting of 1,3-butadiene, isoprene, chloroprene and piperylene.

10. The styrene resin composition of claim 5, wherein the acrylate-styrene-acrylonitrile graft copolymer having a core-shell structure (ASA) comprises an acrylate polymer core in 40 wt % to 60 wt %; and a shell including a styrene monomer and an acrylonitrile monomer grafted on the core in 40 wt % to 60 wt %, wherein a thickness ratio of the core to the shell is from 4:6 to 8:2.

11. The styrene resin composition of claim 10, wherein the shell includes the styrene monomer and the acrylonitrile monomer in a weight ratio of 7:3 to 8:2.

12. The styrene resin composition of claim 10, wherein the acrylate polymer is derived from butyl acrylate, ethylhexyl acrylate or a mixture thereof.

13. The styrene resin composition of claim 7, wherein the styrene monomer is at least one selected from the group consisting of styrene, α-methyl styrene, α-ethyl styrene, p-ethyl styrene, vinyl toluene and a derivative thereof.

14. The styrene resin composition of claim 7, wherein the acrylonitrile monomer is at least one selected from the group consisting of acrylonitrile, methacrylonitrile, ethacrylonitrile and a derivative thereof.

15. The styrene resin composition of claim 4, wherein the styrene resin composition further comprises one or more additives selected from the group consisting of a thermal stabilizer, a lubricant, an antioxidant, a photostabilizer, a flame retardant, an antistatic agent, a coloring agent, a filler and a UV stabilizer.

16. A styrene resin molded product manufactured from the styrene resin composition of claim 4, which has an impact strength of 20 J/m to 25 J/m measured in accordance with ASTM D256 when having a thickness of ¼", and has tensile elongation of 28% to 40% measured in accordance with ASTM D638 under a rate condition of 5 cm/min when having a thickness of ⅛".

17. The styrene resin composition of claim 10, wherein the styrene monomer is at least one selected from the group consisting of styrene, α-methyl styrene, α-ethyl styrene, p-ethyl styrene, vinyl toluene and a derivative thereof.

18. The styrene resin composition of claim 10, wherein the acrylonitrile monomer is at least one selected from the group consisting of acrylonitrile, methacrylonitrile, ethacrylonitrile and a derivative thereof.

19. The heat resistant styrene copolymer of claim 1, wherein the A) α-methyl styrene, the B) acrylonitrile and the C) t-butyl methacrylate have a weight ratio of 70 to 72:23 to 29.5:0.5 to 7.

\* \* \* \* \*